United States Patent [19]
Kearney

[11] 3,973,347
[45] Aug. 10, 1976

[54] FLOATABLE FISHING DEVICE

[76] Inventor: Patrick Kearney, 49-07 169th Street, Flushing, N.Y. 11365

[22] Filed: Oct. 4, 1973

[21] Appl. No.: 403,636

[52] U.S. Cl. .................................. 43/17; 43/43.13
[51] Int. Cl.² ....................................... A01K 97/12
[58] Field of Search ............................ 43/17, 43.13

[56] References Cited
UNITED STATES PATENTS

| | | | |
|---|---|---|---|
| 1,642,582 | 9/1927 | Hansen | 43/43.13 X |
| 1,726,736 | 9/1929 | Good | 43/17 |
| 2,572,427 | 10/1951 | Anglim | 43/43.13 |

*Primary Examiner*—Louis G. Mancene
*Assistant Examiner*—Daniel J. Leach
*Attorney, Agent, or Firm*—Jacob L. Kollin

[57] ABSTRACT

A floatable fishing device comprising a float and fishing lamps to indicate catches of fish on hooks associated with the device. A pair of pendulum operated switches actuate two lamps, of different colors, depending on the direction of the swinging of the pendulum when the float is inclined by the pull of caught fish. The float is provided with a guide rod. A ring secured to the free end of a fishing line is slidable on the guide rod. A plurality of hooks are attached to the fishing line in spaced relationship. The device permits the fisherman to fish at a remote distance.

1 Claim, 5 Drawing Figures

FLOTABLE FISHING DEVICE

SUMMARY OF THE INVENTION

This invention relates to floating fishing device in general and in particular to such a device which can be operated and controlled from the shore or from a boat.

An object of the invention is to provide illuminated means for indicating to fishermen fish caught on a hook or hooks.

Another object is to provide such a device which can be controlled and operated remotely from the shore.

A further object is to provide such a device which can be operated from a ship or boat.

Still another object is to provide a device of the above character, which can be secured to an end of a fishing net so as to move it into a position most favorable for catching fish.

Yet another object is to provide a float on which can be mounted various objects, such as toy boats, floating lounge chairs, outboard motors, all of these being remotely controlled and tethered from the shore.

Another object of the invention is to provide a device of the above character which will indicate the location of the fishing line and hook, or a fishing net by illumination at night.

Figure 1:
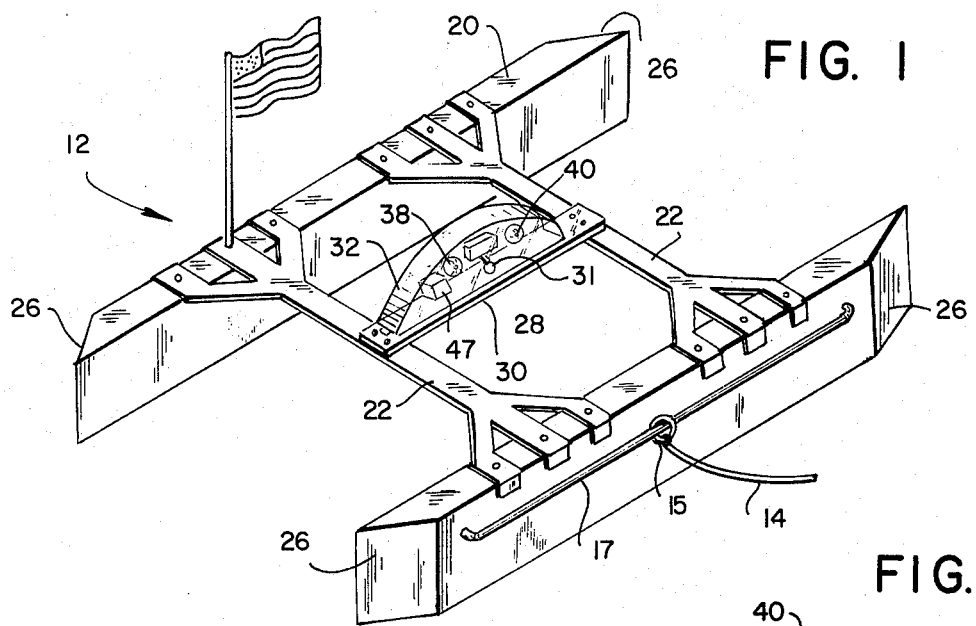
FIG. 1 is a perspective view showing one form of the device in use.
Figure 2:
FIG. 2 is a perspective view of the float of the invention.
Figure 3:
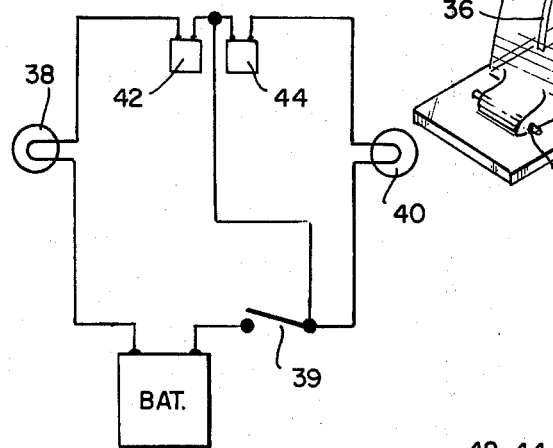
FIG. 3 is a diagram of the electrical circuit of the device.

Referring now to the drawing in detail, the device, generally indicated by the numeral 12, has attached to it a fishing line 14, by means of a ring 15, slidable on a rod 17 secured to one of the members 20 of the device 12 by means of which it is also tethered by a fisherman on shore. A plurality of hooks, not shown, are secured to the line 14.

The float 12 comprises a pair of floatable members 20 which may be of a light wood, plastic or hollow aluminum, secured in spaced parallel relationship by means of braces 22. The floatable members 20 are formed with angular ends 26 to facilitate their movement through water.

Figure 4:
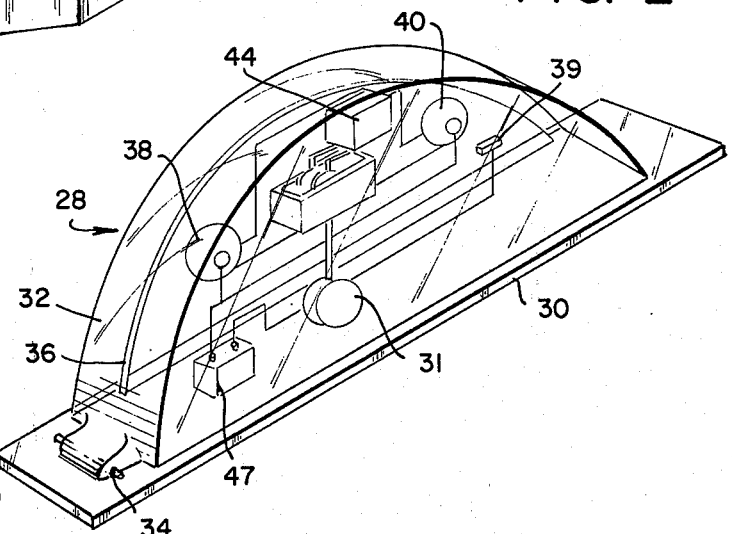
FIG. 4 is a perspective diagram of the switching mechanism.
Figure 5:
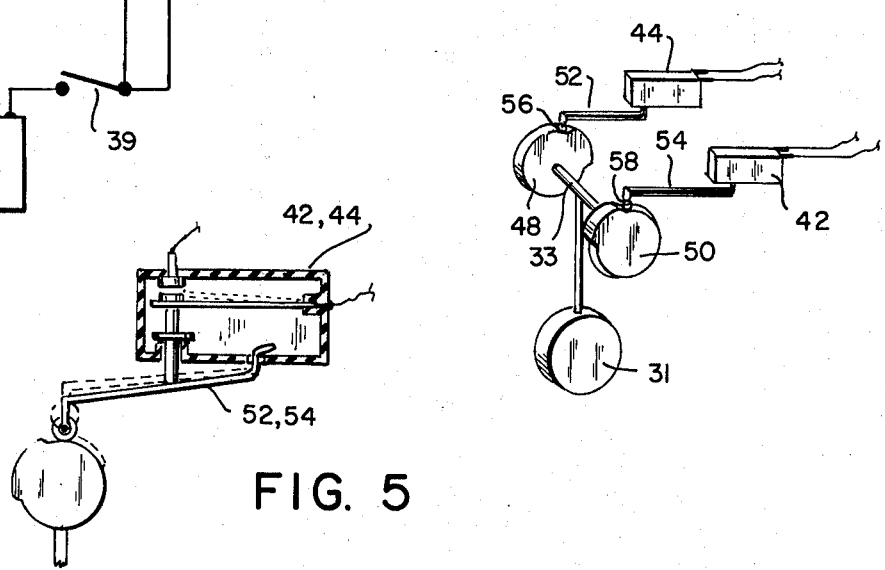
FIG. 5 is a cross section of a microswitch.

Mounted on the braces 22 is a flasher, generally indicated by the numeral 28. The flasher comprises a base 30, a translucent plastic enclosure 32 hinged to the base at 34, and flashing mechanism mounted on the base. One wall of enclosure 32 consists of two adjoining translucent windows, a red one and a green one, for the purpose to be described below. Mounted on the base 30 is a vertical support 36, to which are secured a pair of reflector equipped lamps 38, 40 mounted opposite the respective red and green windows. A power source consisting of a dry cell battery is connected via a pair of pendulum operated microswitches 42, 44 to the two lamps. As shown in schematic perspective in FIG. 4, the pendulum is secured to a shaft 33 swingably mounted on support 36. Mounted on shaft 33 are a pair of notched disks 48, 50. Each of the microswitches is secured to opposite sides of the pendulum is provided with a spring trip arm 52, 54, respectively, formed with ends 56, 58 bearing on the edges of the disks and adapted to enter the notches of the respective disks. Thus when a fish pulls down either side of the float by biting on a hook of the fishing line tethering the float, the pendulum loses its equilibrium and swings into the position shown in FIG. 4, microswitch 42 will be actuated by the end 58 of arm 54 entering the notch of disk 50 and will close the circuit to lamp 38. When the pendulum swings in an opposite direction the circuit to the other lamp 40 will be closed in a similar manner, while the arm 54 will be disengaged from the notch of disk 50, thus opening switch 42. In this manner one or the other of the lamps will be illuminated when fish bite on the hooks, not shown, thus tilting the mechanism 28 and indicating the direction from which they approach, which is frequently desirable by fishermen. An on and off switch 39, disconnects battery 37 when the device is not in use.

The fishing line 14 has one end provided with a ring 15, slidable on a rod 17 to adapt to the normal movement of the device caused by wind or water currents.

The device is operated as follows:

The movable ring can be moved from one end of the rod to the other by a tip of the finger. The fishing line is tied to this ring. The device is placed in the water with the ring on the rod up front of the device. A fisherman using his pole puts a little pressure on his line and walks to the left of the device. Now by releasing his line and at the same time keeping a pull on it the device sails out to sea.

If the fisherman wants to change course, all he has to do is stand still for about twenty seconds and then turn and by giving the rod and line a fast flick he will shift the ring on the rod. The device will now go in the opposite direction; with a slight pull on the line it will go farther and farther away from shore. Due to its construction, once in motion it will always head out to sea. When operated at an angle it will of its own accord put pressure on the line to get farther away from shore.

As a fishing device it has many advantages over a rod and reel. The following are but a few. Attached to the fishing line at some distance apart can be placed from one to twenty sink lines each one separately hooked and baited. Fishing this way a fisherman could land as many as ten fish at a time. If by chance a very large fish is hooked the device will absorb half the pressure on the line. The fish can go either to the right or left or towards the shore, but cannot go further out to sea if the line is locked on the reel. The fisherman has now only to put strong pressure on the line to bring both fish and the device ashore.

The device can also go at least five times farther out from the shore than any line could be cast.

When fishing for small fish, the fisherman could wait for several fish to be hooked and then pull them all in at the same time.

For example, if a deep sea fisherman wants to fish for hundred pound of fish or over, he could use a float that would be over twelve feet long and balanced as required. Instead of a fishing line he could use a light wire cable and for a reel he can use a light pulley which would be attached to a tripod in the center of the boat. In this case he could fish in the following manner:

With his boat standing still he could operate the float in a full circle around his boat and up to a mile away from the boat. Or if his boat is moving he could send his float out a mile and the boat and float would be sailing in the same direction parallel with each other. On this line would be placed a few dozen small rings through which his fishing line would be run. This line would also go through a ring on the side of the float as shown in drawings. When a very large fish would be hooked the fisherman's method of landing it would be many times easier than by rod. He would wind in his fishing reel and the rings on the cable would slide in with such ease that there would be no trouble whatever bringing it aboard. All this time the device will remain in position up to a mile away at sea. Then by winding in the second reel the line and bait is brought out to beside the float again.

When fishing from the shore and an unexpected large fish is hooked or possibly two large fish and say the fishing line broke, a boat can be used to bring in the float and the fish. This could not be done with a fishing pole, because the float is unsinkable.

The device could be used on a large passenger ship or pleasure cruisers to catch large fish such as sharks etc. In such cases the float would have to be about fifteen feet long.

In very rough seas a small flagpole and flag can be installed on the float which will make it more visible from shore or boat. Miniature floats without fishing tackle make an ideal toy for children. These can be very easily operated on ponds, rivers, beaches and even swimming pools.

The float can also be used as a life-saving device in the event of a boat sinking, by holding on to it with one hand and swimming with the other one. In such a case one could stay afloat for many hours until real relief came.

Having thus described my invention, what I claim and desire to secure by Letters Patent of the United States of America is:

1. A floatable fishing device comprising a vertical support member mounted on a pair of braces, switch means including a pendulum having a pivoted end swingable from said vertical support member, a pair of disks secured to said vertical support member on either side of and spaced from said pivoted end, each of said disks being provided with a notch on its peripheral edge portion, a pair of microswitches secured to said vertical support member, each of said microswitches having a trip arm with a down turned end adapted to enter a respective notch on one of said disks upon swinging of said pendulum when said device is pulled downwardly depending on the swinging direction of said pendulum, thereby closing a respective one of said switches, an electrical power supply source, a pair of reflector lamps operable by the respective ones of said switches from said electrical power source and a translucent cover for said switches and said reflector lamps, said cover having a pair of differently colored portions, aligned forward of each of said reflector lamps.

* * * * *